US011455789B1

United States Patent
Sung

(10) Patent No.: US 11,455,789 B1
(45) Date of Patent: Sep. 27, 2022

(54) SYSTEMS AND METHODS FOR DYNAMICALLY CLASSIFYING POINT CLOUD DATA POINTS

(71) Applicant: Illuscio, Inc., Culver City, CA (US)

(72) Inventor: Tim Sung, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/700,927

(22) Filed: Mar. 22, 2022

(51) Int. Cl.
*G06V 10/764* (2022.01)
*G06T 15/00* (2011.01)
*G06V 10/82* (2022.01)

(52) U.S. Cl.
CPC ............ *G06V 10/764* (2022.01); *G06T 15/00* (2013.01); *G06V 10/82* (2022.01)

(58) Field of Classification Search
CPC ....... G06V 10/764; G06V 10/82; G06T 15/00
See application file for complete search history.

(56) References Cited

U.S. PATENT DOCUMENTS

| | | | |
|---|---|---|---|
| 8,831,366 B1* | 9/2014 | Hickman | G06T 19/20 |
| | | | 382/232 |
| 2016/0180195 A1* | 6/2016 | Martinson | G06K 9/628 |
| | | | 382/103 |
| 2018/0247447 A1* | 8/2018 | Serna | G06T 15/405 |
| 2021/0073345 A1* | 3/2021 | St. Romain, II | G06F 30/27 |

* cited by examiner

*Primary Examiner* — Sing-Wai Wu
(74) *Attorney, Agent, or Firm* — Ansari Katiraei LLP; Arman Katiraei; Sadiq Ansari

(57) ABSTRACT

Disclosed is a system for dynamically classifying different data point sets within a point cloud with different classifications that may alter how data point sets with different classifications are processed, edited, and/or rendered. The system may generate a model based on a first set of relationships between a first set of data point elements that result in the first classification, and a second set of relationships between a second set of data point elements that result in the second classification. The system may compare the data point elements from unclassified data point sets against the first set of relationships and the second set of relationships in the model, and may assign the first classification to a particular unclassified data point set in response to the data point elements of the particular data point set having a threshold amount of the first set of relationships.

17 Claims, 7 Drawing Sheets

… (US 11,455,789 B1)

SYSTEMS AND METHODS FOR DYNAMICALLY CLASSIFYING POINT CLOUD DATA POINTS

BACKGROUND

A point cloud may include millions or billions of data points that when rendered together produce a three-dimensional ("3D") image. Each data point may capture the positioning, coloring, and/or other characteristics of a different surface, feature, article, or object at a corresponding point in space. However, data points of a particular point cloud may exist entirely independent of one another. Accordingly, the data points may be processed, edited, and/or rendered independently, and a single data point may be modified without impacting neighboring or other data points.

DETAILED DESCRIPTION OF PREFERRED EMBODIMENTS

Figure 1:
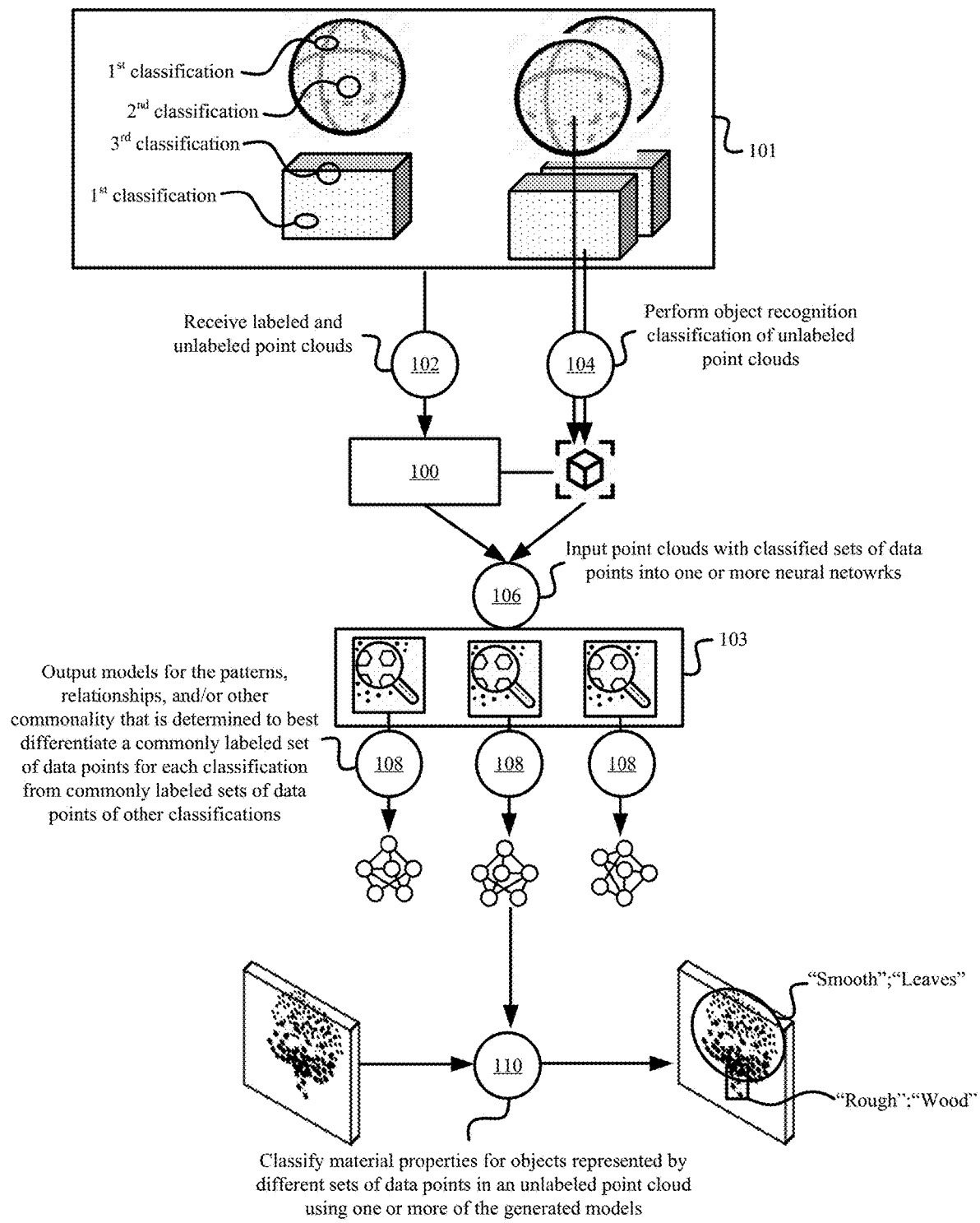
FIG. 1 illustrates an example of generating the models for attributing material properties to sets of data points from a point cloud in accordance with some embodiments presented herein.

The following detailed description refers to the accompanying drawings. The same reference numbers in different drawings may identify the same or similar elements.

Provided are systems and methods for dynamically classifying different sets of data points within a point cloud with different classifications. The classifications may alter the processing, editing, and/or rendering of each set of data points based on different rules associated with each classification.

In some embodiments, the systems and methods may include a point cloud classifier that dynamically determines and attributes material properties for objects represented by the different sets of data points. The point cloud classifier may use artificial intelligence and/or machine learning ("AI/ML") techniques to develop and/or model the patterns, relationships, and/or other commonality for different combinations of data point positional and/or non-positional elements that differentiate between the different classifications and/or material properties. The point cloud classifier may apply the modeled patterns, relationships, and/or other commonality to data points of an unlabeled point cloud in order to dynamically attribute material properties to different sets of the data points that have positional and/or non-positional element values that match or satisfy the modeled patterns, relationships, and/or other commonality associated with the attributed material properties.

The classifications and/or material properties may be associated with different rules. The rules may adjust how different sets of data points associated with different material properties are processed, edited, rendered, and/or otherwise manipulated.

A point cloud may include a plurality of data points that are positioned within a three-dimensional ("3D") space and that collectively generate a 3D image of a 3D environment and/or one or more 3D objects within the 3D environment. Each data point may capture the positioning and coloring of a different surface, feature, article, or object from the 3D environment at a corresponding point in the 3D space. Accordingly, each data point may include positional elements and non-positional elements.

The positional elements may include coordinates within the 3D space. For instance, each point cloud data point may include x-coordinate, y-coordinate, and z-coordinate elements to capture the position of an imaged surface, feature, article, or object from the 3D environment at a corresponding position in the 3D space.

The non-positional elements may include information about the detected characteristics of the surface, feature, article, or object imaged at a corresponding position in the 3D space. This may include visual and non-visual characteristics of the corresponding surface, feature, article, or object.

In some embodiments, the characteristics represented by the non-positional elements may correspond to a detected color. The color may be represented using red, green, blue ("RGB"), and/or other values. In some embodiments, the characteristics represented by the non-positional elements may provide the chrominance, translucency, reflectivity, and/or luminance of the imaged surface, feature, article, or object. In some embodiments, the characteristics may be related to properties of the device used to generate each of the data points. For instance, the characteristics may include a Tesla strength value to quantify the strength of the magnetic field that was used in detecting and/or imaging the surface, feature, article, or object represented by a particular point cloud data point. In some embodiments, the non-positional elements may include energy, audio or sound, and/or other characteristics of the device or the object being imaged. Accordingly, the non-positional elements can include any property of the imaged surface, feature, article, or object (e.g., hue, saturation, brightness, reflectivity, etc.), or of the device used to capture the object part at a corresponding data point in 3D space.

The point cloud and the individual data points of the point cloud may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. In some embodiments, the point cloud data points may be defined from the output of two or more devices. For instance, a first imaging device (e.g., a LiDAR sensor) may determine the position and/or an intensity value for each data point in 3D space, and a second imaging device (e.g., a high-resolution camera) may use photogrammetry to measure or capture the visual characteristics and/or other non-positional information for each data point. The outputs of the first imaging device and the second imaging device may be mapped and/or combined to generate a point cloud with data points having positional and non-positional elements defined by the output of the first imaging device and the second imaging device.

FIG. 1 illustrates an example of generating the models for attributing material properties to sets of data points from a point cloud in accordance with some embodiments presented herein. As shown in FIG. 1, point cloud classifier 100 may receive (at 102) one or more point clouds 101 with which to train the material property classification models. One or more point clouds 101 may include labeled and/or unlabeled point clouds.

Each labeled point cloud 101 may include one or more data point sets that are labeled with a classification and/or material property. For instance, a first data point set (e.g., set of two or more data points) of labeled point cloud 101 may be labeled with a "wood" material property, and a second data point set of labeled point cloud 101 may be labeled with a "plastic" material property. In some embodiments, the classifications and/or material properties may be stored within one or more non-positional elements of the first and second data point sets. In some other embodiments, the classifications and/or material properties may be stored as metadata of labeled point cloud 101.

In some embodiments, the classifications and/or material properties may be arbitrarily defined. In some other embodiments, the classifications and/or material properties may correspond to classifications and/or material properties that are specified within a material definition or taxonomy, and each classification and/or material property specified in the material definition or taxonomy may be associated with one or more rules that define how data points associated with that classification and/or material property are to be processed, edited, and/or rendered differently from other data points that are not associated with that same classification and/or material property.

Each unlabeled point cloud 101 may include data points that are not labeled with any of the classifications or material properties found in labeled point clouds 101, the material definition, and/or the taxonomy. Point cloud classifier 100 may perform (at 104) a high-level object recognition classification of the objects represented by the data points of unlabeled point cloud 101 so that unlabeled point clouds 101 may be used as additional training data for the classification modeling. Performing (at 104) the high-level object recognition classification may include rendering the point cloud data points to produce an image, performing object recognition, image analysis, and/or another computer vision technique to determine the material property associated with different objects appearing within the rendered images, and associating the determined material property for each particular object to the data points that were used to render that particular object.

Point cloud classifier 100 may use the one or more point clouds 101 to train models for differentiating between different classifications and/or material properties based on different combinations of positional and non-positional element values. In some embodiments, point cloud classifier 100 may input (at 106) labeled point clouds 101 and unlabeled point clouds 101 with the high-level classifications into one or more neural networks 103.

Each neural network 103 may use a different AI/ML technique to determine unique patterns, relationships, and/or other commonality in the positional elements and/or non-positional elements of commonly classified sets of data points, wherein the unique patterns, relationships, and/or other commonality uniquely identify or differentiate one or more sets of data points labeled with a particular classification from other sets of data points labeled with other classifications. In other words, each neural network 103 may perform a different analysis and/or evaluation of the values from one or more positional elements and non-positional elements of commonly labeled sets of data points, as well as relationships between the values of a commonly labeled set of data points, to derive a value combination from different elements or relationships that uniquely or best identify one material property from other material properties. In some embodiments, each neural network 103 may use and/or may be combined with decision trees, logistical regression, nearest neighbors, and/or other classification algorithms to determine unique patterns, relationships, and/or other commonality.

Each neural network 103 may output (at 108) one or more models for the patterns, relationships, and/or other commonality that is determined to best differentiate a commonly labeled data point set for each classification from commonly labeled data point sets of other classifications. Point cloud classifier 100 may compare the models generated by each neural network 103, and may select the model or the specific pattern, relationship, or other commonality that identifies each classification and/or material property with the greatest accuracy and least amount of overlap with the patterns, relationships, or commonality used to identify other classifications and/or material properties.

Point cloud classifier 100 may apply (at 110) the one or more selected models to classify the material properties for objects represented by different sets of data points in an unlabeled point cloud. Specifically, point cloud classifier 100 may compare different sets of data points from the unlabeled point cloud to determine if the positional and/or non-positional elements of those sets of data points match or satisfy the modeled patterns, relationships, and/or other commonality for the different material properties. Point cloud classifier 100 may assign one or more material properties to a data point set having positional and/or non-positional elements in common with the model that is generated for those one or more material properties. Assigning the one or more material properties may include tagging or labelling the data point set or each data point in the data point set with the one or more material properties. In some embodiments, point cloud classifier 100 may add a new positional element for each assigned material property to each data point of the data point set.

The generated models classify the data points of an unlabeled point cloud with greater accuracy and specificity than the high-level object recognition techniques described above. For instance, the generated models may classify the data points based on a greater variety and combination of positional and/or non-positional element values than the high-level object recognition, wherein the high-level object recognition is based on matching a form and color of an object in one image to a labeled object in another image. Additionally, the generated models may classify the data points based on patterns, relationships, and/or other commonality amongst the positional and/or non-positional elements of the individual data points used in rendering a larger object rather than commonality in the shape and form of the larger rendered object with other objects.

Figure 2:
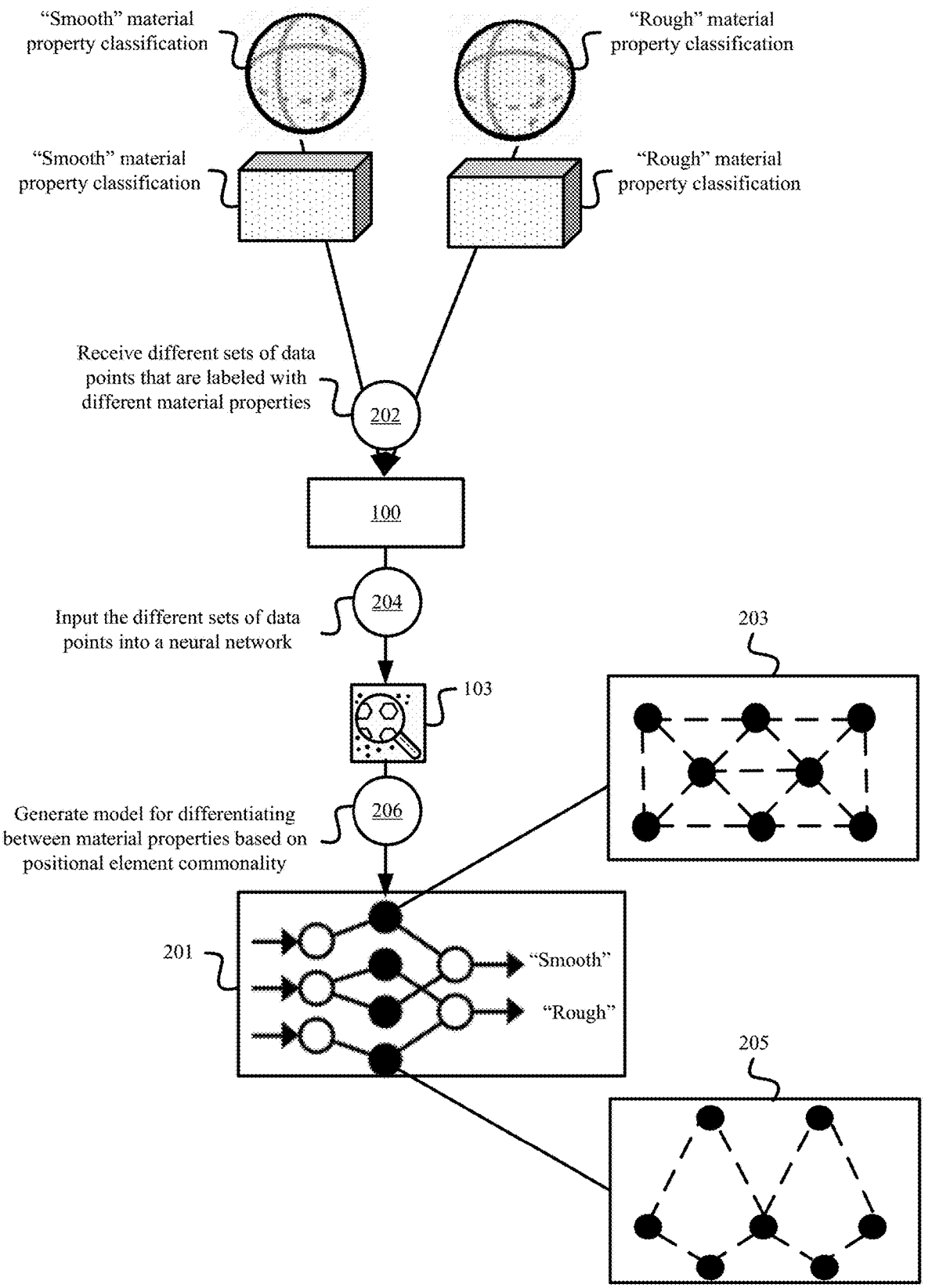
FIG. 2 illustrates an example of differentiating between different material properties based on positional element relationships that are modeled for the different material properties in accordance with some embodiments presented herein.

FIG. 2 illustrates an example of differentiating between different material properties based on positional element relationships that are modeled for the different material properties in accordance with some embodiments presented herein. As shown in FIG. 2, point cloud classifier 100 may receive (at 202) a set of data points that is labeled with a "smooth" material property, and a different set of data points that is labeled with a "rough" material property.

Point cloud classifier 100 may input (at 204) the different sets of data points with the different "smooth" and "rough" classifications to neural network 103. Neural network 103 may be configured to detect patterns, relationships, and/or other commonality in the positional elements of the data point sets that differentiate between the "smooth", "rough", and/or other classifications. Specifically, neural network 103 may be configured to determine differences between the structural composition or arrangement of the data point sets with the "smooth" classification and the structural composition or arrangement of the data point sets with the "rough" classification and/or other classifications.

Neural network 103 may generate (at 206) model 201 for classifying each of the "smooth" and "rough" material properties based on patterns, relationships, and/or other commonality in the structural composition or arrangement of the "smooth" sets of data points that differentiate from the "rough" sets of data points and/or other sets of data points with other classifications. In some embodiments, neural network 103 may generate (at 206) model 201 based on a first set of positional element value combinations that are found in the greatest number of data point sets with the "smooth" classification and that are not found in any of the data points sets with the "rough" classification and/or other classifications, or that are found in the least number of data points sets with the "rough" classification and/or other classifications. Similarly, neural network 103 may generate (at 206) model 201 based on a second set of positional element value combinations that are found in the greatest number of data point sets with the "rough" classification and that are not found in any of the data points sets with the "smooth" classification and/or other classifications, or that are found in the least number of data points sets with the "smooth" classification and/or other classifications. In other words, model 201 may identify the patterns, relationships, and/or other commonality in the positional elements that are unique to the "smooth" classified sets of data points, and the patterns, relationships, and/or other commonality that are unique to the "rough" classified sets of data points.

As shown in FIG. 2, model 201 may specify first unique pattern 203 with which data points of the "smooth" material property are most commonly arranged, and different second unique pattern 205 with which data points of the "rough" material property are most commonly arranged. Each pattern 203 and 205 may specify a different amount of distance and different positional offsets between neighboring data points and/or a subset of data points of each classification. In some embodiments, patterns 203 and 205 may correspond to the structural composition and/or a highly detailed scan of the outer layer of the different material properties. Model 201 may include other commonality detected in the positional elements of the "smooth" sets of data points and the "rough" sets of data points that may be used in conjunction with or independent of patterns 203 and 205 to differentiate between the "smooth" and "rough" material properties. In some embodiments, model 201 may include multiple different patterns or variations of pattern 203 for classifying a set of data points with the same "smooth" classification.

In some embodiments, point cloud classifier 100 may enhance the material property classification or supplement the material property classification by incorporating different combinations of the non-positional elements with or without the positional elements into the classification modeling. Specifically, the non-positional elements add additional parameters with which to differentiate between the various material properties, and/or additional parameters from which to generate new models for classifying other material properties. For instance, the positional elements may be used to identify a material property based on the arrangement and/or structural composition (e.g., texture, density, distribution, strength, shape, etc.) within a set of data points, whereas the non-positional elements of the same set of elements may be used to identify a material property based on coloring, reflectivity, and/or other non-positional characteristics.

Figure 3:
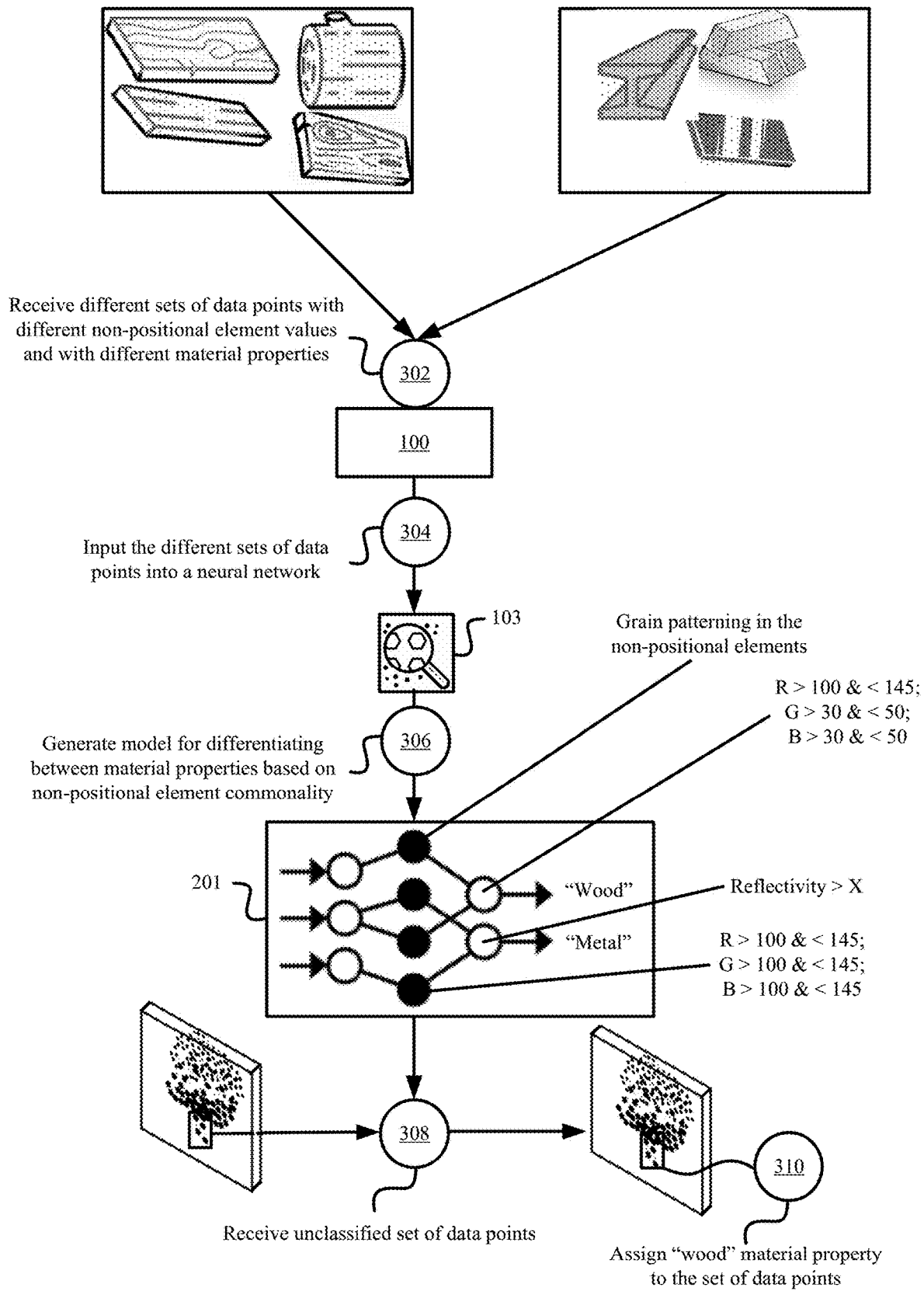
FIG. 3 illustrates an example of modeling different non-positional element relationships for different material properties in accordance with some embodiments presented herein.

FIG. 3 illustrates an example of modeling different non-positional element relationships for different material properties in accordance with some embodiments presented herein. As shown in FIG. 3, point cloud classifier 100 may receive (at 302) first sets of data points with non-positional elements defined with a first set of colors, reflectivity values, and a "wood" material property, and second sets of data points with non-positional elements defined with a second set of colors, reflectivity values, and a "metal" material property. Point cloud classifier 100 input (at 304) the first and second sets of data points to neural network 103.

Neural network 103 may determine unique patterns, relationships, and other commonality present within the non-positional elements of the first sets of data points that are not present within the non-positional elements of the second sets of data points or sets of data points with other classifications using decision trees, logistical regression, nearest neighbors, and/or other classification algorithms. Similarly, neural network 103 may determine unique patterns, relationships, and other commonality present within the non-positional elements of the second sets of data points that are not present within the non-positional elements of the first sets of data points or sets of data points with other classifications. For instance, neural network 103 may determine that the non-positional elements of the first sets of data points produce a grain pattern and have RGB color values within a brownish range, and that the non-positional elements of the second sets of data points have high reflectivity values and RGB color values within a grayish range. In some embodiments, the unique patterns, relationships, and other commonality of the non-positional elements may be modeled using one or more values that are derived from the non-positional elements. For instance, neural network 103 may determine a range, average set of values, or expected distribution of RGB color values for the first sets of data points with the first material property classification that is different than a range, average set of values, or expected distribution of RGB color values for the second sets of data points with the second material property classification. Neural network 103 may generate (at 306) model 201 based on the determined patterns, relationships, and other commonality in the non-positional elements of the commonly labeled or classified sets of data points.

Point cloud classifier 100 may receive (at 308) a set of data points from an unlabeled point cloud. Point cloud classifier 100 may compare and/or evaluate the non-positional elements of the set of data points against model 201 to determine if the non-positional elements from the set of data points match or satisfy patterns, relationships, and/or other commonality from model 201 for one or more material properties. Point cloud classifier 100 may assign (at 310) material properties to the unlabeled set of data points based on the comparison results. Specifically, point cloud classifier 100 may assign (at 310) the "wood" material property to the set of data points based on non-positional elements of the set of data points defining a grain pattern, RGB color values within the brownish range, and/or other descriptive characteristic that match or satisfy the modeled non-positional element patterns, relationships, and commonality for the "wood" material type.

In some embodiments, point cloud classifier 100 may use the models to refine the classifications. For example, a first model may evaluate a set of data points based on a first set of positional and/or non-positional elements to classify the set of data points as "metal" or "wood". A second model may evaluate the set of data points based on the "metal" classification and a second set of positional and/or non-positional elements to classify the set of data points as "steel", "aluminum", etc. In this example, the first model may differentiate between the "metal" and "wood" material properties based on a first set of patterns, relationships, and/or other commonality that are determined by a first set of AI/ML techniques or classification algorithms that evaluate the coloring and reflectivity of data points labeled with the respective material properties, and the second model may differentiate between the different types of the "material" material property based on a second set of patterns, relationships, and/or other commonality that are determined by a second set of AI/ML techniques or classification algorithms that evaluate the positioning and arrangement of data points labeled with the specific metal classification.

In some embodiments, point cloud classifier 100 may bias the models to modify weights of different parameters or synapses used in classifying the material properties. In some embodiments, point cloud classifier 100 may use a location, time of day, and/or other environmental data to bias the models and/or alter the assignment of different material properties to different sets of data points.

Figure 4:
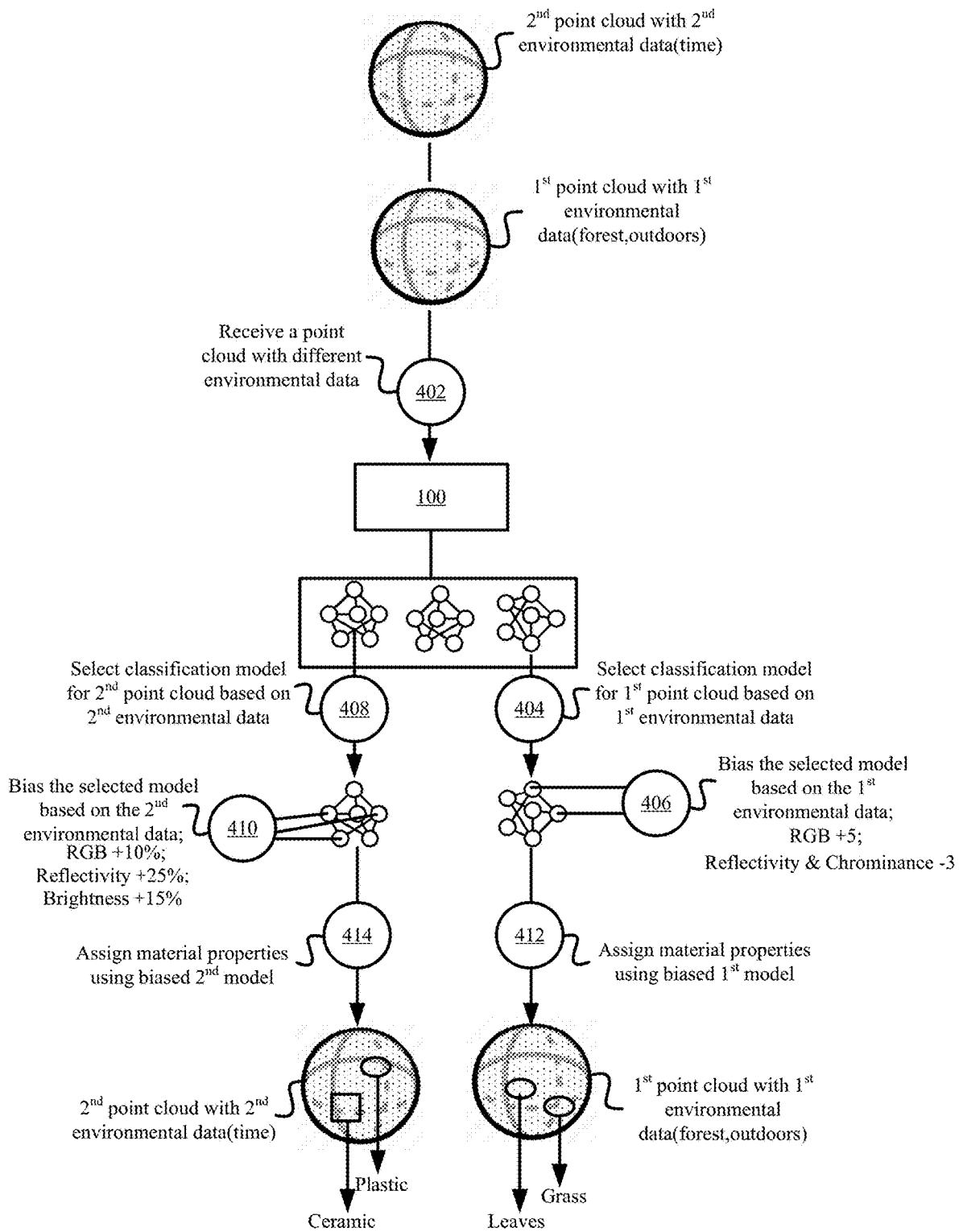
FIG. 4 illustrates an example of biasing the material property classification models in accordance with some embodiments presented herein.

FIG. 4 illustrates an example of biasing the material property classification models in accordance with some embodiments presented herein. Point cloud classifier 100 may receive (at 402) two point clouds and different environmental data associated with each point cloud. The environmental data may be stored in the point cloud metadata or may be provided as input that is separate from the point clouds.

The environmental data associated with the first point cloud may correspond to a location associated with the first point cloud. The location may identify where the 3D environment represented by the first point cloud is located or where the point cloud was captured or generated. In some embodiments, the location information may be specified as Global Positioning System ("GPS") coordinates, longitude and latitude, and/or other positional coordinates. Point cloud classifier 100 may map the positional coordinates to values that identify the location. For instance, the positional coordinates may be mapped to values "outdoors", "forest", "body of water", "building", "street", etc. In some embodiments, the environmental data may be directly specified using the mapped values rather than the positional coordinates.

Point cloud classifier 100 may bias the material property classification for the data points of the first point cloud based on the first environmental data values of "forest" and "outdoors". Specifically, point cloud classifier 100 may select (at 404) a first model with which to classify the data points of the first point cloud based on the first environmental data associated with the first point cloud. In some embodiments, the selected (at 404) first model may differentiate between material properties found in forests and/or the outdoors. In other words, the first model may be developed for a specific set of material properties that relate to the first environmental data of the first point cloud.

Point cloud classifier 100 may bias (at 406) parameters of the first model to attribute greater weight to one or more first parameters (e.g., color values) and/or less weight to one or more second parameters (e.g., reflectivity and chrominance values) used in differentiating between the material properties of the first model. The biasing (at 406) may target modeled patterns, relationships, and/or other commonality that may change in response to changes in the first environment data. Consequently, matching or satisfying the positional and/or non-positional elements of a set of data points from the first point cloud to patterns, relationships, and/or other commonality of the one or more first parameters may provide a larger contribution towards a particular material property classification than matching or satisfying the positional and/or non-positional elements of the set of data points to patterns, relationships, and/or other commonality of the one or more second parameters.

The second environmental data associated with the second point cloud may correspond to a timestamp associated with the second point cloud. The timestamp may indicate a time of day or date when the second point cloud was generated and/or captured.

Point cloud classifier 100 may select (at 408) a second model with which to classify the data points of the second point cloud based on the second environmental data associated with the second cloud. Point cloud classifier 100 may perform (at 410) a different biasing of the parameters of the second model based on the second environmental data associated with the second point cloud. For instance, point cloud classifier 100 may attribute lesser weight to the one or more first parameters (e.g., color values) and/or more weight to the one or more second parameters (e.g., reflectivity and chrominance values), or may adjust weights of other parameters that may be affected by the second environmental data and not the first environmental data. As shown in FIG. 4, point cloud classifier 100 may adjust the weight given to parameters of the second model that differentiate between different material properties based on brightness, reflectivity, and RGB color values and based on different impacts that different times of day have on these parameters.

Point cloud classifier 100 may use the biased first model to assign (at 412) material properties to different data point sets within the first point cloud, and the biased second model to assign (at 414) material properties to different data point sets within the second point cloud. An unbiased model may classify a data point set having a particular set of positional and non-positional element values with a different material property than the same model biased with different environmental data.

Figure 5:
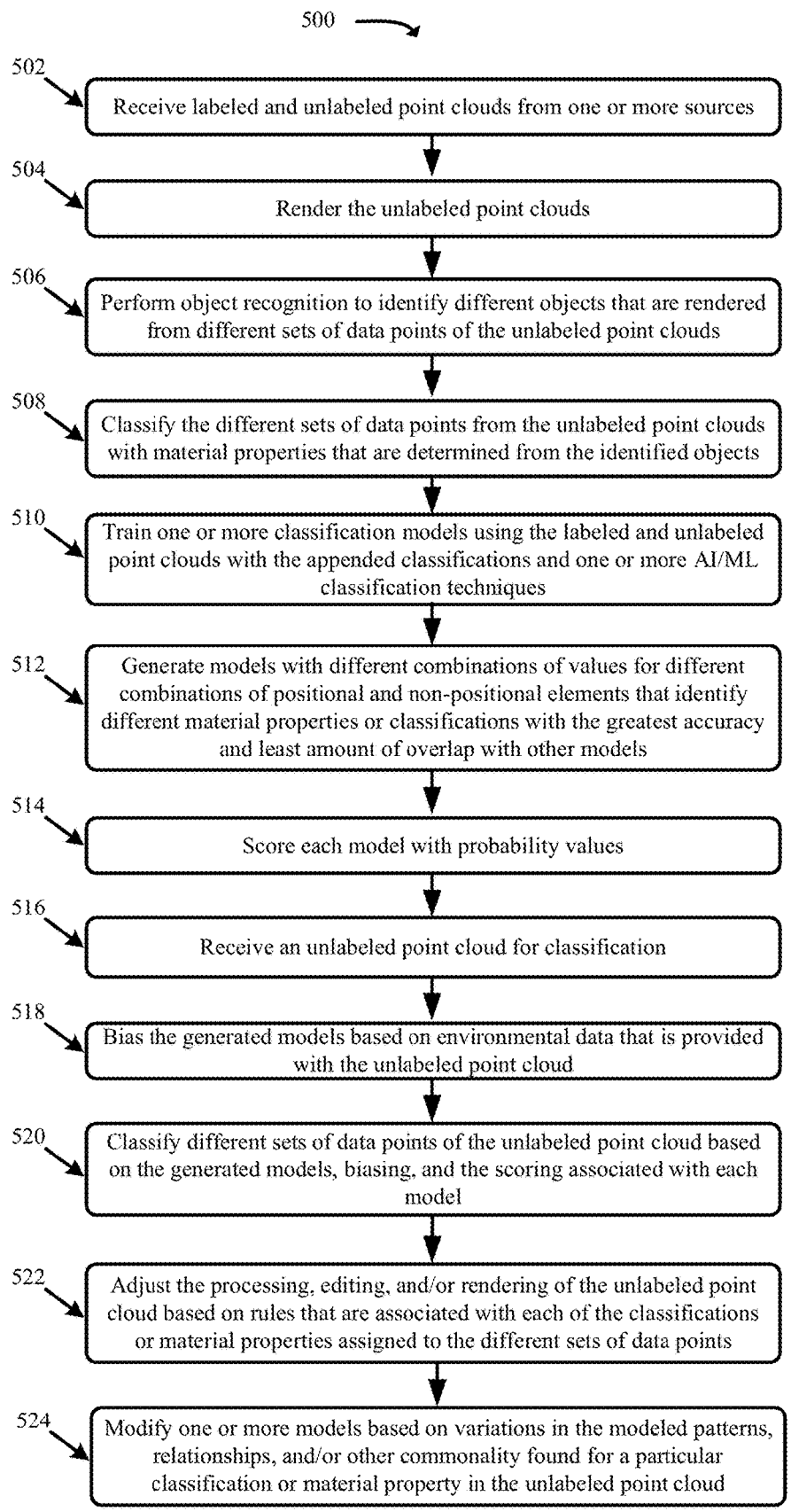
FIG. 5 presents a process for classifying different sets of data points in an unlabeled point cloud with different material properties in accordance with some embodiments presented herein.

FIG. 5 presents a process 500 for classifying different sets of data points in an unlabeled point cloud with different material properties in accordance with some embodiments presented herein. Process 500 may be implemented by point cloud classifier 100.

In some embodiments, point cloud classifier 100 may include a distributed device that runs at a customer site or is used exclusively by a particular user or entity. In some such embodiments, point cloud classifier 100 may include a set of material property classification models that are trained using a baseline set of labeled point clouds, and may refine the models based on variation of the modeled material properties found in point clouds provided by the particular user or entity to point classifier 100.

In some other embodiments, point cloud classifier 100 may include a centralized device that runs in the "cloud" and/or that is remotely accessible by multiple users or entities. In some such embodiments, point cloud classifier 100 may train a set of material property classification models using the baseline set of labeled point clouds, and may refine the models based on variations of the modeled material properties found in point clouds uploaded by the different users or entities to point cloud classifier 100.

Process 500 may include receiving (at 502) a plurality of labeled and unlabeled point clouds from one or more sources. The labeled point clouds may include material properties and/or other classifications for different set of data points. The unlabeled point clouds may include data points that are not associated with any material properties and/or other classifications found in the labeled point clouds. However, the data points of the unlabeled point clouds may include representations for similar objects and/or variations of objects represented by the data points in the labeled point clouds.

Process 500 may include rendering (at 504) the unlabeled point clouds, and performing (at 506) object recognition, image analysis, and/or another computer vision technique to identify different objects that are rendered from different sets of data points of the unlabeled point clouds. Process 500 may include classifying (at 508) the different sets of data points from the unlabeled point clouds with material properties that are determined from the identified objects. In this manner, point cloud classifier 100 may expand the training data used for the modeling to include unlabeled point clouds.

Process 500 may include training (at 510) one or more classification models. Training (at 510) the one or more classification models may include inputting the plurality of labeled and unlabeled point clouds with appended classifications into one or more neural networks, decision trees, logistical regressions, pattern recognition techniques, relationship modeling techniques, and/or other AI/ML classification techniques. In some embodiments, the one or more neural networks may include Convolutional Neural Networks ("CNNs"), Recurrent Neural Networks ("RNNs"), and/or other Deep Neural Networks ("DNNs").

Training (at 510) the one or more classification models may include detecting different patterns, relationships, and/or other commonality in the positional and non-positional elements of different sets of data points that may be used to uniquely identify and differentiate material properties. In some embodiments, each AI/ML classification technique may focus on detecting patterns, relationships, and/or other commonality in different sets of data point positional and/or non-positional elements. For instance, a first neural network may identify unique structural compositions for different material properties by analyzing differentiating patterns, relationships, and/or other commonality in the positional elements, and a second decision tree approach may identify unique visual characteristics for different material properties based on differentiating patterns, relationships, and/or other commonality in the non-positional elements.

The AI/ML techniques may compare different combinations of the positional and non-positional elements from commonly labeled sets of data points to corresponding combinations of the positional and non-positional element from sets of data points that are labeled with different material properties or classifications. Based on the comparisons, the AI/ML techniques may determine the particular combination of positional and non-positional elements that uniquely identifies a set of data points with a particular material property or classification with the greatest accuracy and most consistency, and with the most amount of differentiation from combinations of positional and non-positional elements used to identify data points of other material properties or combinations. In other words, if a first set of values for one or more positional and/or non-positional elements is found in data points with different classifications or material properties, than the first set of values for the one or more positional and/or non-positional elements does not differentiate between different material properties and is not used in the model of any particular classification. However, if a second set of values for one or more positional and/or non-positional elements is found in multiple sets of data points having a single classification or material property and not in other sets of data points with other classifications or material properties, than the second set of values for the one or more positional and/or non-positional elements may be selected and used as part of the model for identifying that single classification or material property.

Process 500 may include generating (at 512) one or more models with different combinations of values for different combinations of positional and non-positional elements that identify different material properties or classifications with the greatest accuracy and least amount of overlap with other models. In some embodiments, a model may include layers of synapses that lead to different probabilities for different material properties or classifications. Each synapse layer may correspond to values for one or more positional and/or non-positional elements that contribute to the identification of a particular material property or classification. Collectively, the synapse layers form a pattern, multi-parameter relationship, and/or other commonality for uniquely differentiating one material property or classification from other material properties or classifications.

Process 500 may include scoring (at 514) the parameters and/or classifications within each model. The scores leading to a particular classification may be derived based on the number or percentage of different sets of data points that are labeled with the particular classification and that have positional elements and/or non-positional elements with values that match or satisfy the pattern, multi-parameter relationship, and/or other commonality modeled for that particular classification. The scores may also be derived based on the number or percentage of sets of data points that are labeled with other classifications that also match or satisfy the modeled pattern, multi-parameter relationship, and/or other commonality.

In some embodiments, the scoring (at 514) may include determining a score or percent contribution that each synapse or parameter of the model contributes to a particular classification. For instance, some positional elements, non-positional elements, and/or combinations of elements may be more important towards than the particular classification than other elements, and may therefore be scored accordingly. Consequently, a set of data points that match or satisfy some but not all of the patterns, relationships, and/or other commonality within a model may still be scored, and if the score exceeds a threshold (e.g., >70), then the set of data points may be assigned the particular classification. For instance, the "wood" material property may be modeled to include a grain patterning, brownish coloring, a specific texture, and a particular density of data points. A set of data points may include the grain patterning, brownish coloring, and particular density of data points and not the specific texture. In this case, the model may still score and classify the set of data points with the "wood" material property despite the set of data points not satisfying or matching to all parameters of the modeled pattern, relationship, and/or other commonality for the "wood" material property.

Process 500 may include receiving (at 516) an unlabeled point cloud for classification. Process 500 may include biasing (at 518) the one or more generated models based on environmental data that is provided with the unlabeled point cloud. The biasing (at 518) may include adjusting the weights and/or scoring associated with various parameters of the models in order to increase and/or decrease the impact that different positional elements and/or non-positional elements have on the material property classification.

Process 500 may include classifying (at 520) different sets of data points of the unlabeled point cloud based on the one or more generated models, biasing, and the scoring associated with each model. Although data points of the unlabeled point cloud may be alternatively classified by rendering the unlabeled point cloud and applying object recognition, image analysis, and/or other techniques to identify material properties appearing in the rendered image, this manner of classification is much less accurate and relies on fewer parameters than when comparing the positional and non-positional element values of the data points to the generated models. Specifically, the object recognition may perform the classification based on coloring and form of the rendered object. Some of the rendered object may be hidden from view and the coloring may be altered due to shading, lighting, and/or other effects causing the object recognition classification to use a small subset of data to classify the material property of the rendered objects. Classification based on the modeled patterns, relationships, and/or other commonality between positional and non-positional elements of a set of data points is not affected by unseen parts of an object or data points that are not visualized onscreen. The non-positional elements are not affected by shading, lighting, and/or other effects that may be applied to render the image. Moreover, the models may perform the classification based on specific relationships between the positional and non-positional element values of two or more data points which provides many more points of comparison and increases the number of parameters from which to base a material property classification than when comparing one rendered image to another.

Process 500 may include adjusting (at 522) the processing, editing, and/or rendering of the unlabeled point cloud based on rules that are associated with each of the classifications or material properties assigned to the different sets of data points. In some embodiments, a definition file may associate one or more processing, editing, and/or rendering rules to each classification or material property. For instance, positional and/or non-positional elements of a first set of data points with a first classification may be adjusted a first amount in response to particular input and an editing rule associated with the first classification. The same positional and/or non-positional elements of a second set of data points with a second classification or no classification may be adjusted by a different second amount in response to the same particular input and a different editing rule or no editing rule being associated with the second set of data points.

Process 500 may include modifying (at 524) the one or more models based on variations in the modeled patterns, relationships, and/or other commonality found for a particular classification or material property in the unlabeled point cloud. For instance, the unlabeled point cloud may include a set of data points with positional and/or non-positional element values that match or satisfy a modeled pattern for a particular material property. The positional and/or non-positional element values of the set of data points may be at the outer edge of the modeled pattern. Accordingly, modifying (at 524) the one or more models may include adjusting the modeled pattern to shift the range of acceptable values. Alternatively, the set of data points may include a subset of positional and/or non-positional element values that are not part of the modeled pattern but that contribute to the unique identification of the particular classification. Accordingly, modifying (at 524) the one or more models may include modifying the modeled pattern to include a new synapse or parameter for the subset of positional and/or non-positional element values, and/or enhancing the modeled pattern to include the subset of positional and/or non-positional element values in the identification of the particular classification. In some embodiments, modifying (at 524) the one or more models may also include adjusting the scoring or probability values associated with labeling a set of data points with a particular classification.

Figure 6:
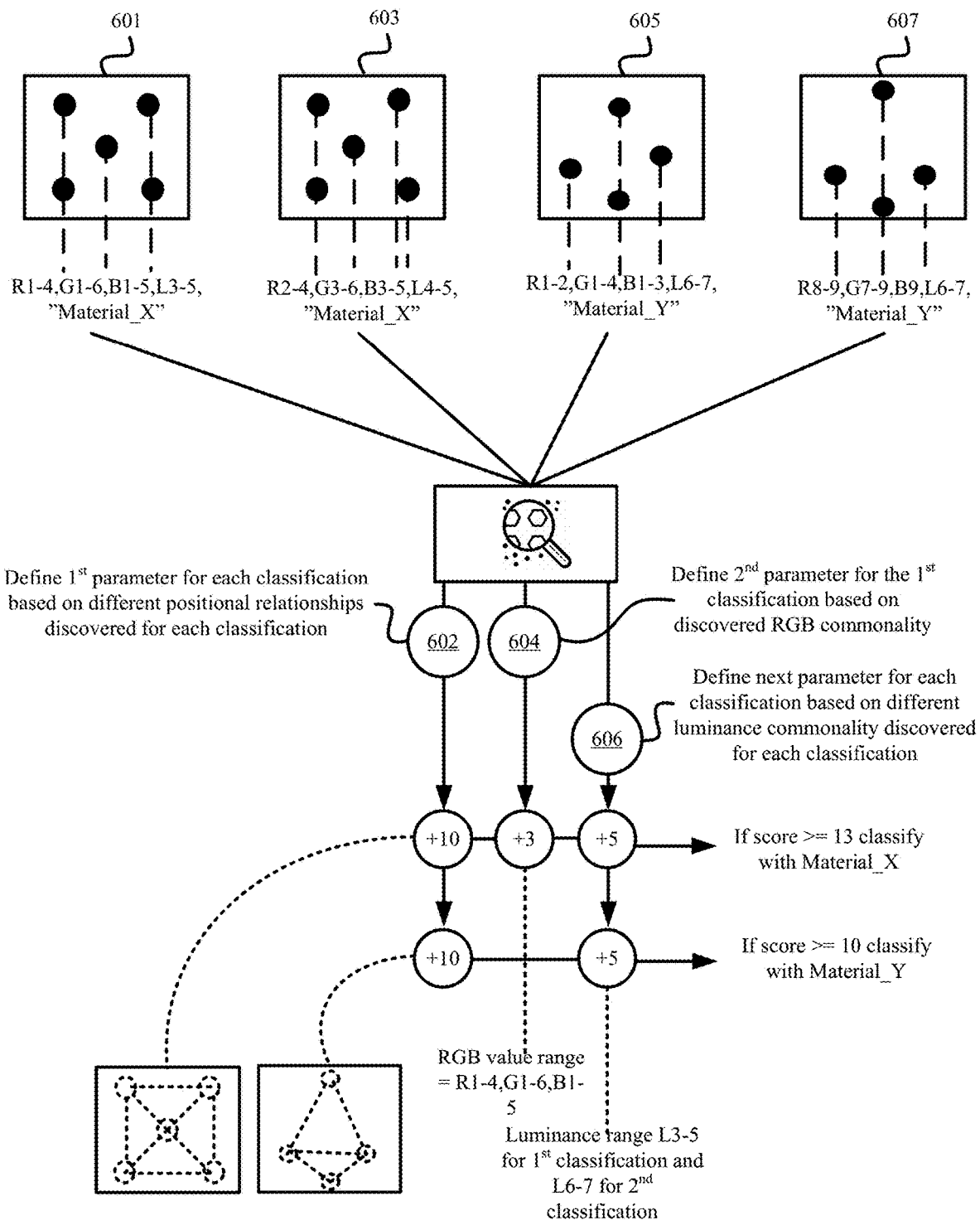
FIG. 6 illustrates an example of scoring parameters of a model in accordance with some embodiments presented herein.

FIG. 6 illustrates an example of scoring parameters of a model in accordance with some embodiments presented herein. The scoring is determined from elements of a first set of data points 601 and a second set of data points 603 that are labeled with a first classification, and a third set of data points 605 and a fourth set of data points 607 that are labeled with a second classification. One or more neural networks may evaluate the sets of data points 601, 603, 605, and 607.

The one or more neural network may determine that the positional elements of the first and second sets of data points 601 and 603 define a unique first arrangement that is different than the unique second arrangement defined by the positional elements of the third and fourth sets of data points 605 and 607. Accordingly, the neural networks may add (at 602) the first arrangement as a first parameter of a first synapse layer leading to the first classification, and may the second arrangement as a first parameter of a second synapse layer leading to the second classification. Since each arrangement is unique to each classification, the neural networks may assign a first score to each of the first parameters. In other words, the neural networks may define the first parameter for each classification based on different positional relationships that are discovered for each classification from analyzing, comparing, and/or evaluating the positional elements of each set of data points 601, 603, 605, and 607.

The one or more neural networks may further determine that RGB values of the first, second, and third sets of data points 601, 603, and 605 are in a particular range. Accordingly, the particular range of RGB values may contribute towards the first classification but not the second classification since the particular range of RGB values is present in each set of data points with the first classification 601 and 603 but only one of the two sets of data points with the second classification 605 and 607. A second parameter may be added (at 604) to the first synapse layer for the RGB values in the particular range. However, since the third set of data points 605 with the second classification is also found to have the RGB values in the particular range, a lesser score may be attributed to the second parameter than the first parameter which is exclusive to sets of data points with the first classification.

The one or more neural networks may further determine that luminance values of the first and second sets of data points 601 and 603 fall in a common first range, and that luminance values of the third and fourth sets of data points 605 and 607 fall in a common second range. However, the neural networks may determine that difference between the common first range and the common second range is less than a threshold amount. Accordingly, a new parameter for the luminance values may be added (at 606) to each synapse layer with a score that is greater than the second score but less than the first score to reflect the lesser differentiating value that the luminance values have towards the first and second classifications than the arrangement of positional elements.

The neural networks may then determine an overall score or threshold score for classifying a set of data point with the classification that is associated with each synapse layer. Different threshold scores may be defined based on different parameters and/or confidence associated with the parameters that are used to differentiate between the different classifications.

In some embodiments, the model may output a matrix with a different probability score for each classification or material property of the model. For instance, a model may be used to differentiate between the "wood", "metal", "ceramic", and "plastic" material properties. For each set of data points, the model may output a matrix with a probability value for classifying that set of data points with each of the "wood", "metal", "ceramic", and "plastic" material properties. The probability values may be based on the number of parameters modeled for each material property that is satisfied by the positional and/or non-positional elements of the set of data points, and/or the degree by which the positional and/or non-positional elements satisfy the parameters modeled for each material property. The set of data points may be classified with the material property that has the highest probability, and/or with one or more material properties when the probability values computed for the one or more material properties exceed certain thresholds. For instance, a set of data points may be labeled with the "ceramic" and "plastic" material properties when the probability value associated with the "ceramic" material property is 0.71, the probability value associated with the "plastic" material property is 0.85, and the threshold for a material property classification is a value greater than 0.7.

Figure 7:
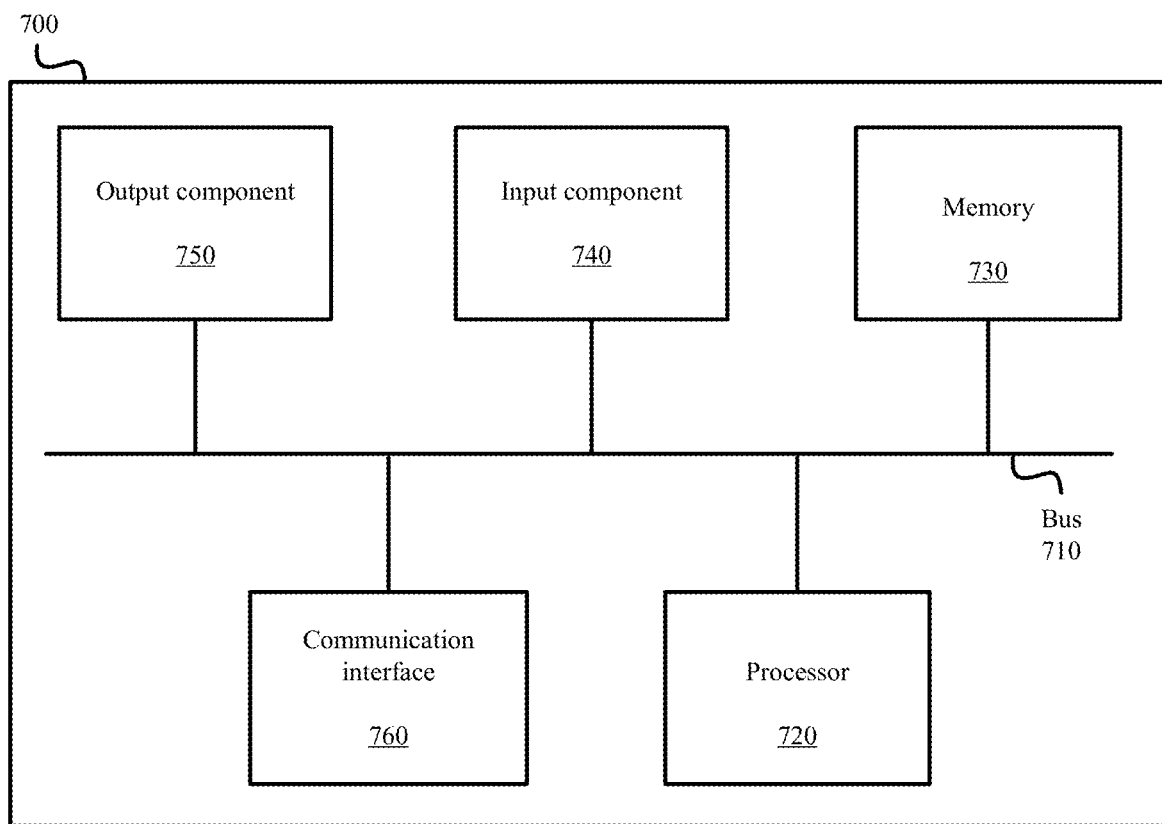
FIG. 7 illustrates example components of one or more devices, according to one or more embodiments described herein.

FIG. 7 is a diagram of example components of device 700. Device 700 may be used to implement one or more of the devices or systems described above (e.g., point cloud classifier 100, neural networks 103, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    generating a model that differentiates between data point sets associated with a first material property and data point sets associated with a second material property, wherein each data point of the data point sets associated with the first material property or the second material property is defined with a plurality of elements for positional and non-positional characteristics of the data point, and wherein the model comprises a first set of relationships between a first set of the plurality of elements and the first material property, and a second set of relationships between a second set of the plurality of elements and the second material property;
    receiving a point cloud comprising one or more data point sets;
    comparing values for the first set of elements from the one or more data point sets against the first set of relationships in the model, and values for the second set of elements from the one or more data point sets against the second set of relationships in the model;
    assigning the first material property to a particular data point set of the one or more data point sets in response to the values for the first set of elements from the particular data point set comprising a threshold amount of the first set of relationships;
    receiving input for adjusting one or more elements of the particular data point set and a second data point set of the one or more data point sets from the point cloud by a first amount;
    adjusting the one or more elements of the second data point set by the first amount in response to the input;
    determining a rule that is associated with the first material property and that modifies the first amount to a second amount; and
    adjusting the one or more elements of the particular data point set by the second amount in response to the input, the particular data point set being assigned the first material property, and the rule that is associated with the first material property.

2. The method of claim 1 further comprising:
    inputting a plurality of point clouds comprising the data point sets associated with the first material property and the data point sets associated with the second material property into one or more neural networks.

3. The method of claim 1 further comprising:
    scoring each particular relationship of the first set of relationships based on a number of the data point sets associated with the first material property that include the particular relationship.

4. The method of claim 3 further comprising:
    scoring each particular relationship of the first set of relationships based on a number of the data point sets associated with the second material property that exclude the particular relationship and other data point sets that exclude the particular relationship.

5. The method of claim 1,
    wherein the one or more data point sets of the point cloud represent objects in a three-dimensional ("3D") space with different material properties.

6. The method of claim 1 further comprising:
    rendering the one or more data point sets of the point cloud to generate an image with a particular object at a position defined by the particular data point set that has the first material property.

7. The method of claim 1, wherein generating the model comprises:
    determining a first arrangement of data points that is unique to the first material property based on the first set of elements from the data point sets associated with the first material property positioning the data point sets associated with the first material property in a formation that matches the first arrangement; and
    determining a second arrangement of data points that is unique to the second material property based on the second set of elements from the data point sets associated with the second material property positioning the data point sets associated with the second material property in a formation that matches the second arrangement.

8. The method of claim 1, wherein generating the model comprises:
    determining a first range of values for the first set of elements that is unique to the data point sets associated with the first material property; and
    determining a second range of values for the second set of elements that is unique to the data point sets associated with the second material property, wherein the first set of elements comprises one or more color elements, and wherein the second set of elements comprises one or more reflectivity, luminance, and chrominance elements.

9. The method of claim 1 further comprising:
receiving environmental data with the point cloud; and
biasing the model based on the environmental data, wherein biasing the model comprises adjusting one or more relationships of the first set of relationships in response to the environmental data increasing or decreasing a weight associated with the one or more relationships.

10. The method of claim 1, wherein generating the model comprises:
defining a first relationship of the first set of relationships based on a first pattern within a first subset of the plurality of elements of the data point sets associated with the first material property, wherein the first pattern specifies a structure by which the data point sets associated with the first material property are arranged in space; and
determining a second relationship of the first set of relationships based on a second pattern within a second subset of plurality of elements of the data point sets associated with the first material property, wherein the second pattern produces a unique texture for the data point sets associated with the first material property.

11. The method of claim 1, wherein assigning the first material property comprises:
adding a new element to the plurality of elements with an identifier associated with the first material property to each data point of the particular data point set.

12. A system comprising:
one or more processors configured to:
generate a model that differentiates between data point sets associated with a first material property and data point sets associated with a second material property, wherein each data point of the data point sets with the first material property or the second material property is defined with a plurality of elements for positional and non-positional characteristics of the data point, and wherein the model comprises a first set of relationships between a first set of the plurality of elements and the first material property, and a second set of relationships between a second set of the plurality of elements and the second material property;
receive a point cloud comprising one or more data point sets;
compare values for the first set of elements from the one or more data point sets against the first set of relationships in the model, and values for the second set of elements from the one or more data point sets against the second set of relationships in the model;
assign the first material property to a particular data point set of the one or more data point sets in response to the values for the first set of elements from the particular data point set comprising a threshold amount of the first set of relationships;
receive input for adjusting one or more elements of the particular data point set and a second data point set of the one or more data point sets from the point cloud by a first amount:
adjust the one or more elements of the second data point set by the first amount in response to the input;
determine a rule that is associated with the first material property and that modifies the first amount to a second amount; and
adjust the one or more elements of the particular data point set by the second amount in response to the input, the particular set of data points being assigned the first material property, and the rule that is associated with the first material property.

13. The system of claim 12, wherein the one or more processors are further configured to:
input a plurality of point clouds comprising the data point sets associated with the first material property and the data point sets associated with the second material property into one or more neural networks.

14. The system of claim 12, wherein the one or more processors are further configured to:
score each particular relationship of the first set of relationships based on a number of the data point sets associated with the first material property that include the particular relationship.

15. The system of claim 14, wherein the one or more processors are further configured to:
score each particular relationship of the first set of relationships based on a number of the data point sets associated with the second material property that exclude the particular relationship and other data point sets that exclude the particular relationship.

16. A method comprising:
generating a model that differentiates between data point sets associated with a first material property and data point sets associated with a second material property, wherein each data point of the data point sets associated with the first material property or the second material property is defined with a plurality of elements for positional and non-positional characteristics of the data point, and wherein the model comprises a first set of relationships between a first set of the plurality of elements and the first material property, and a second set of relationships between a second set of the plurality of elements and the second material property;
receiving a point cloud comprising one or more data point sets;
comparing values for the first set of elements from the one or more data point sets against the first set of relationships in the model, and values for the second set of elements from the one or more data point sets against the second set of relationships in the model;
assigning the first material property to a particular data point set of the one or more data point sets in response to the values for the first set of elements from the particular data point set comprising a threshold amount of the first set of relationships;
receiving input to adjust one or more elements of one or more data points from the particular data point set by a first amount;
modifying the first amount to a second amount based on one or more of (i) the first material property associated with each data point of the particular data point set or (ii) a rule that is defined for the first material property and that applies to the one or more elements; and
adjusting values of the one or more elements of the particular data point set by the second amount in response to the input.

17. A system comprising:
one or more processors configured to:
generate a model that differentiates between data point sets associated with a first material property and data point sets associated with a second material property, wherein each data point of the data point sets with the first material property or the second material property is defined with a plurality of elements for positional and non-positional characteristics of the data point, and wherein the model comprises a first set of relationships between a first set of the plurality of elements and the first material property, and a second set of relationships between a second set of the plurality of elements and the second material property;

receive a point cloud comprising one or more data point sets;

compare values for the first set of elements from the one or more data point sets against the first set of relationships in the model, and values for the second set of elements from the one or more data point sets against the second set of relationships in the model;

assign the first material property to a particular data point set of the one or more data point sets in response to the values for the first set of elements from the particular data point set comprising a threshold amount of the first set of relationships;

receive input to adjust one or more elements of one or more data points from the particular data point set by a first amount;

modify the first amount to a second amount based on one or more of (i) the first material property associated with each data point of the particular data point set or (ii) a rule that is defined for the first material property and that applies to the one or more elements; and adjust values of the one or more elements of the particular data point set by the second amount in response to the input.

* * * * *